United States Patent [19]
Fredlund et al.

[11] Patent Number: 6,075,542
[45] Date of Patent: *Jun. 13, 2000

[54] METHOD OF COMBINING TWO DIGITAL IMAGES

[75] Inventors: John Randall Fredlund; Ronald Steven Cok, both of Rochester, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/681,778

[22] Filed: Jul. 29, 1996

[51] Int. Cl.⁷ .................................................. G06T 15/00
[52] U.S. Cl. .............................................................. 345/425
[58] Field of Search ..................... 345/422, 435, 345/113, 114, 413, 414, 425, 430, 436, 419

[56] References Cited

U.S. PATENT DOCUMENTS

| | | | |
|---|---|---|---|
| 5,255,352 | 10/1993 | Falk | 395/125 |
| 5,363,476 | 11/1994 | Kurashige et al. | 395/125 |
| 5,459,819 | 10/1995 | Watkins et al. | 395/117 |
| 5,586,231 | 12/1996 | Florent et al. | 395/125 |
| 5,625,765 | 4/1997 | Ellenby et al. | 395/135 |

OTHER PUBLICATIONS

Deering, "Exploration of Display Interfaces for Virtual Reality", Virtual Reality 1993 International Symposium IEEE, pp. 141–147, 1993.

*Primary Examiner*—Mark R. Powell
*Assistant Examiner*—Motilewa Good-Johnson
*Attorney, Agent, or Firm*—Frank Pincelli

[57] ABSTRACT

A method of combining at least one captured generated digital image at a prestored digital image. The prestored digital image has one or more predetermined locations where a captured generated digital image and/or text may be placed, the location having a predetermined 3-D image structure. The customer generated digital image is modified in accordance with the predetermined 3-D image structure so as to form a first modified image and is combined with the selected prestored digital image at the predetermined location so as to form a newly merged digital image. The merged image is forwarded to an appropriate output device.

10 Claims, 6 Drawing Sheets

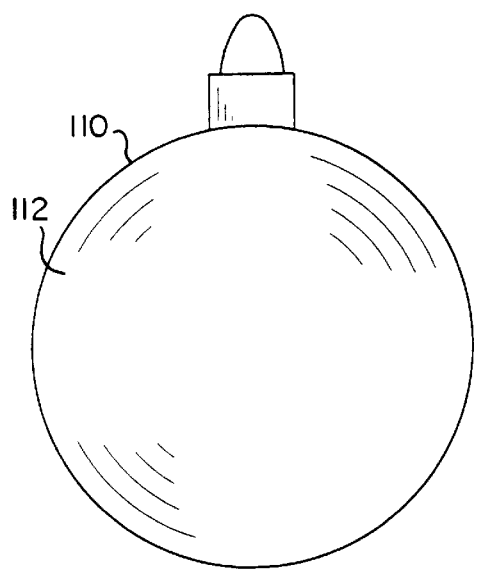
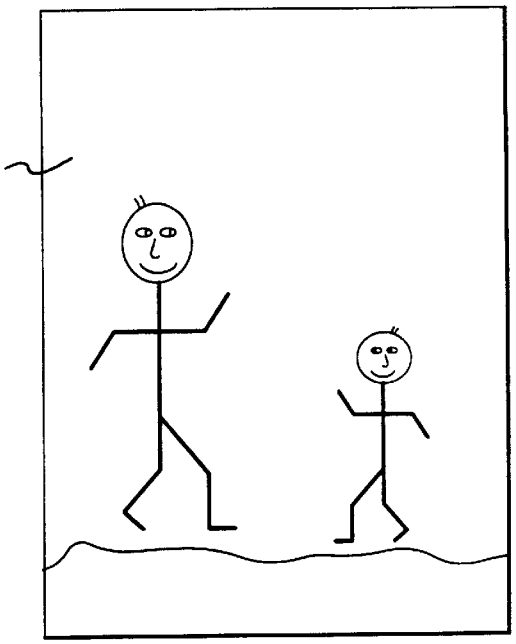
FIG. 8
FIG. 9
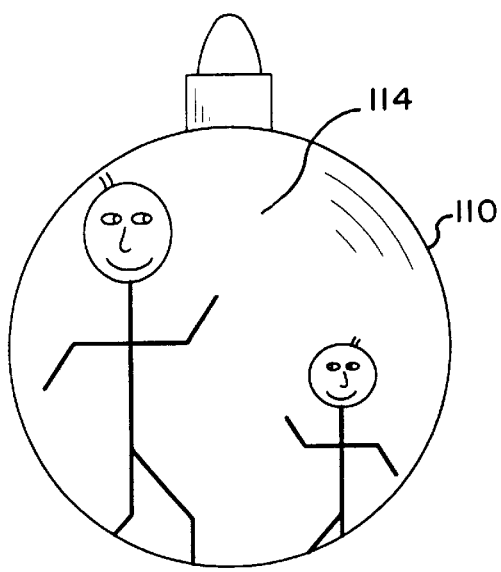
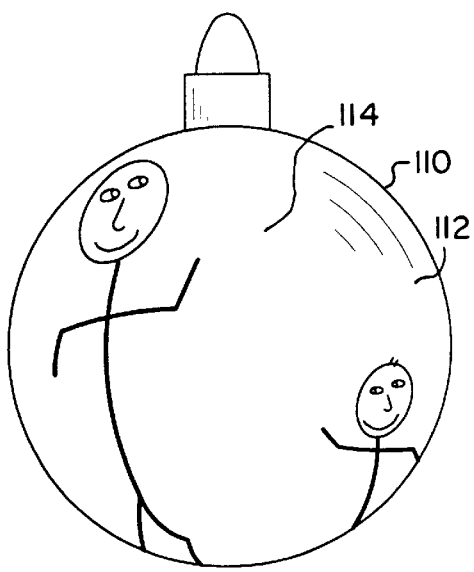
FIG. 10
(PRIOR ART)
FIG. 11

METHOD OF COMBINING TWO DIGITAL IMAGES

FIELD OF THE INVENTION

A system and method for producing customized images by merging at least two images obtained from different sources and printing the image on at least one output format.

BACKGROUND OF THE INVENTION

It is known from U.S. Pat. No. 5,459,819 that two digital images can be merged together to form a single new composite digital image. Typically, this is obtained by combining a customer generated digital image with a prestored digital image. When the prestored image and customer generated image have the same general visual 3-D shape, 3-D structure, or texture (3-D structure) the combined images can be quite pleasing. However, when the visual 3-D structures are different, the merging of the two images can be less than aesthetically pleasing. That is, the customer generated image may appear as if it was just pasted onto the prestored digital image.

Applicants have solved the foregoing problem by taking into account the three-dimensional characteristics of the prestored digital image and adjusting the customer generated image such that it substantially corresponds to that of the prestored digital image.

SUMMARY OF THE INVENTION

A method of combining at least one captured generated digital image and/or text with at least one prestored digital image, comprising the steps of:

a) selecting a prestored digital image, the prestored digital image having one or more predetermined locations where a captured generated digital image and/or text may be placed, the location having a predetermined image 3-D structure;

b) providing at least one capture means for obtaining at least one customer generated image in digital form;

c) providing at least one output means for printing, displaying, transmitting, or storing of an image;

d) modifying the captured customer generated digital image in accordance with the predetermined image 3-D structure so as to form a first modified image;

e) combining the first modified image and the selected prestored digital image at the predetermined location so as to form a newly merged digital image; and f) forwarding the merged digital image to the output means.

DESCRIPTION OF THE DRAWINGS

In the detailed description of the preferred embodiment of the invention presented below, reference is made to the accompanying drawings, in which:

FIG. 8 is a plan view of a second prestored digital image for receiving a customer generated image;

FIG. 9 is an example of a second customer generated digital image;

FIG. 10 illustrates the second prestored digital image of FIG. 8 merged with the second customer generated image of FIG. 9 in accordance with the prior art; and FIG. 11 illustrates the second prestored digital image of FIG. 8 merged with the second customer generated image of FIG. 9 in accordance with the present invention.

DETAILED DESCRIPTION OF THE INVENTION

Figure 1:
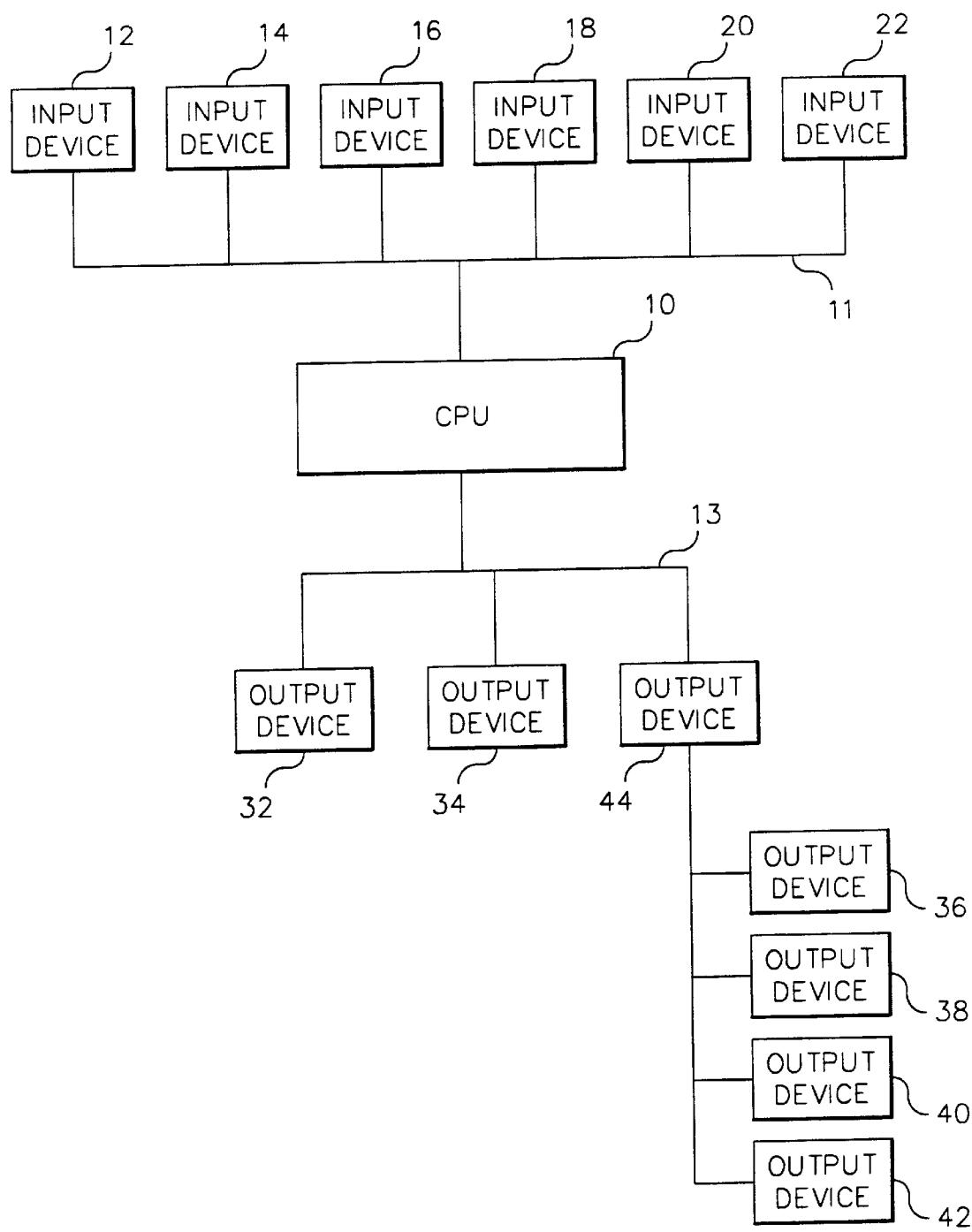
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12, 14, 16, 18, 20, 22 are provided for generating a image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16, 18, 20, 22 are provided for obtaining digital signals representative of an image from various sources. In particular, input device 16 is a video camera (where the output is digitized) and input device 18 comprises a CD (compact disc) reader for reading digitally stored information on a compact disc. Input device 20 comprises a electronic camera such as the DCS 200 Digital Camera, produced by the Eastman Kodak Company. Input device 22 may be any other input device which is capable of providing a digital signal representative of an image to the CPU, for example, video tape, or video laser disc.

The CPU 10 is also connected to a variety of output devices 32, 34, 36, 38, 40, 42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer such as the Kodak Image Magic Heavy Stock Printer, sold by the Eastman Kodak Company, which takes the digital image and transfers the image onto media which can then be used to produce transfers for use on garments. The output device 34 in the embodiment illustrated is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLT 7720 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an ink jet printer which can be used to imprint the merged image on greeting cards and the like. Various other devices may be provided for transferring onto various other formats such as, garments, mugs, posters, banners, life size cut-outs, holographic and 3-D imaging, balloons, pens, and pencils.

In the preferred embodiment illustrated, a server 44, such as the Power PC Apple Macintosh Computer, is used for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

Is to be understood that the CPU 10 may be provided with a monitor for viewing various screens for indicating the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, which may be the operator and/or customer, can also view the various images being input into the system and generated by the system so that the appropriate selections can be made by the user and/or customer. In the CPU there is stored a plurality of prestored images which may comprise a variety of artistic themes having at least one location for receiving a customer generated digital image. Any one of these prestored images may be selected and digitally merged with the customer generated image(s) captured by any of the input devices 12, 14, 16, 18, 20, 22.

A more detailed description of the operation of the system disclosed in FIG. 1 is described in U.S. Pat. No. 5,459,819, which is hereby incorporated by reference in its entirety.

Figure 3:
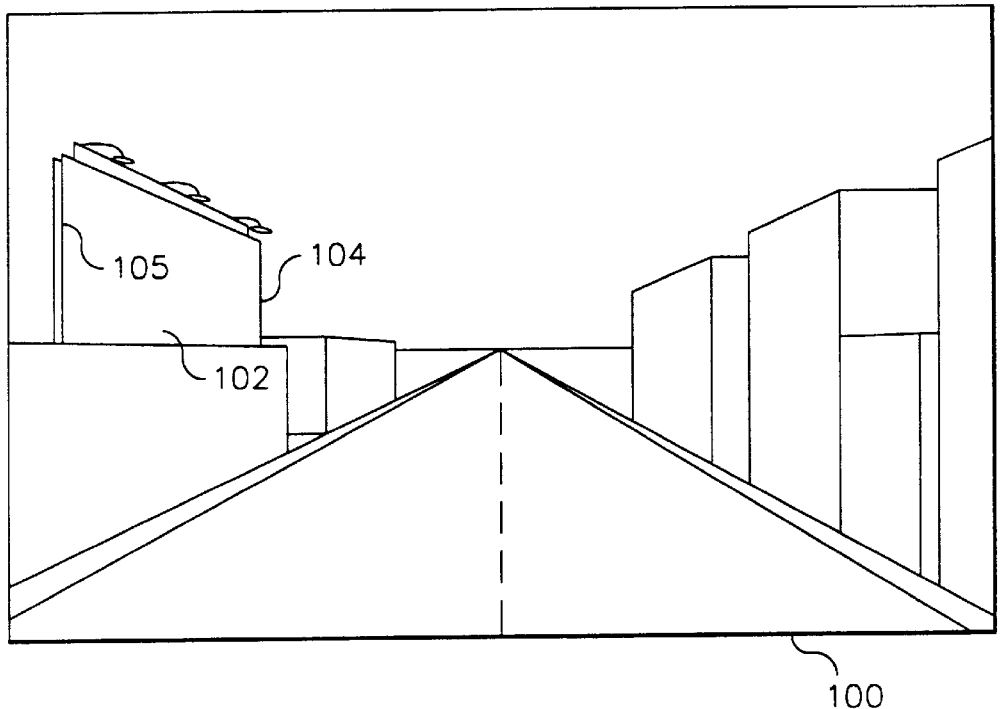
FIG. 3 illustrates an example of a prestored digital image having at least one location for placement of a customer generated digital image.

Referring to FIG. 3, there is illustrated a prestored digital image 100 having a location/opening 102 designed to receive a customer generated image. As can be seen from FIG. 3, the location 102 at which the customer generated image is to be placed, is somewhat trapezoidal in shape, but more importantly, with regard to the prestored digital image, location 102 is representative of a billboard wherein the billboard has a further edge 104 which is visually further in the scene of image 100 than the closer edge 105. Thus, the location 102 has a three-dimensional visual 3-D structure to it.

Figure 4:
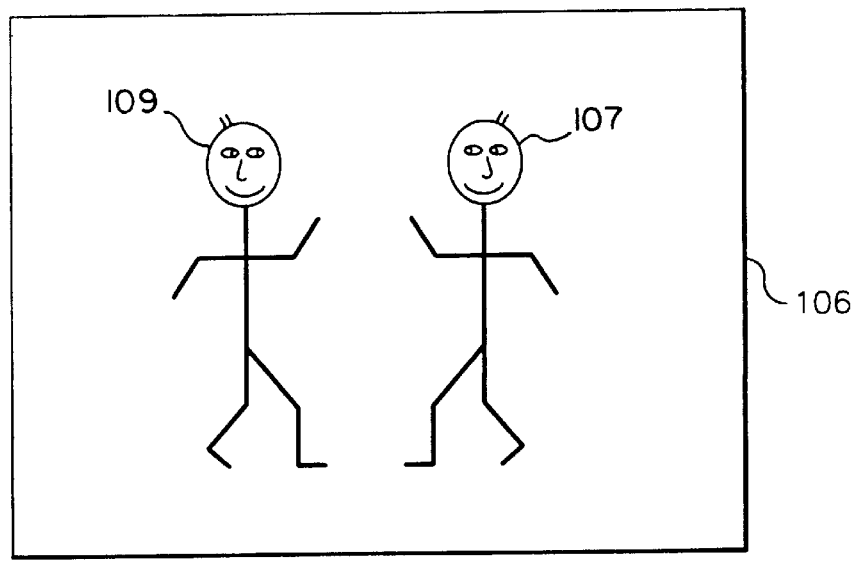
FIG. 4 is an example of a customer generated image.

Referring to FIG. 4, there is illustrated a customer generated image 106 designed for placement at location 102 of prestored digital image 100. As can be seen from FIG. 4, the subjects 107, 109 within image 100 are illustrated in typical elevational view, thus, the customer generated image has substantially no visual depth or 3-D structure.

Figure 5:
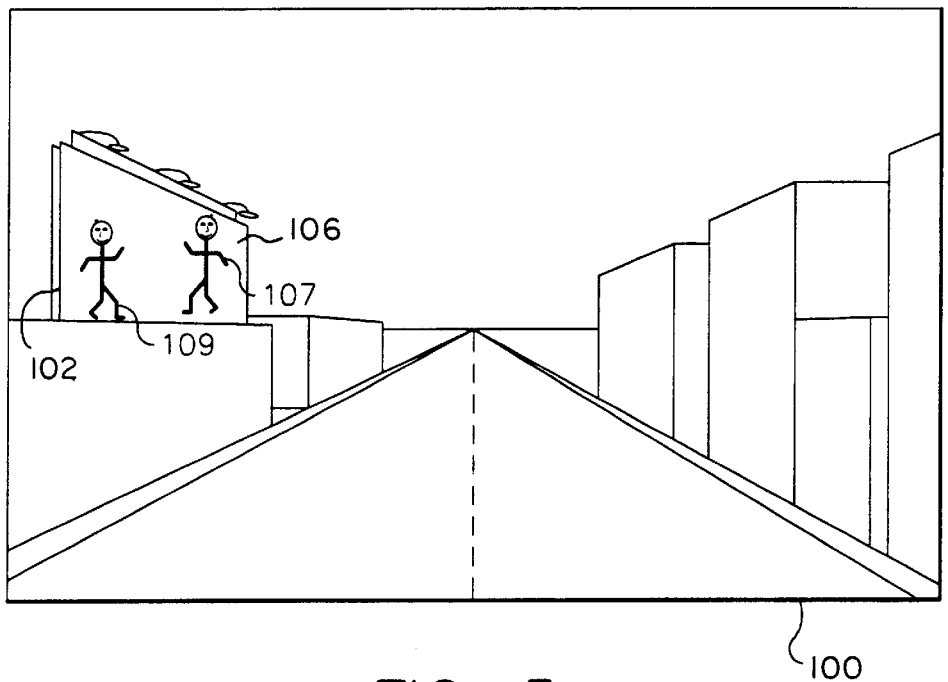
FIG. 5 is an example of how a customer generated image would typically be placed in the prestored digital image according to prior art.

Referring to FIG. 5, there is illustrated the prestored digital image 100 with the customer generated image 106 merged at location 102 utilizing one technique according to the prior art. According to this technique, in order for the image 106 to be placed at the location 102, which is substantially trapezoidal in shape, a cropping of the image 106 was performed. However, the merged image does not give a very aesthetic, pleasing view as the 3-D structure of the customer image 106 is contrary to the 3-D structure of the prestored digital image 100.

Figure 6:
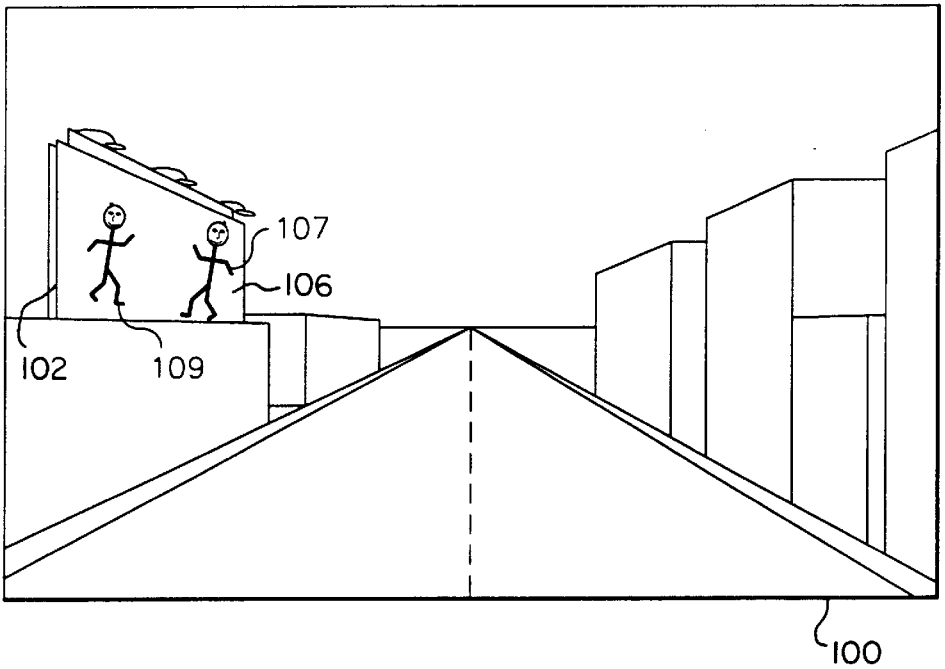
FIG. 6 illustrates another example of the prior art wherein the customer generated image of FIG. 4 would be inserted into the prestored digital image of FIG. 3.

Referring to FIG. 6, the customer generated image 106 has been placed at location 102 of the prestored digital image 100 in accordance with a second technique according to the prior art. In this technique, the customer generated image 106 was cropped and rotated so that each of the images therein are within the prescribed location 102. However, the individuals 107, 109 with image 106 are still shown in a substantial elevational manner, whereas the scene of the prestored digital image at this location is totally different. Here again, the individuals 107, 109 in the image 106 appear out of 3-D structure with the prestored digital image 100.

Figure 7:
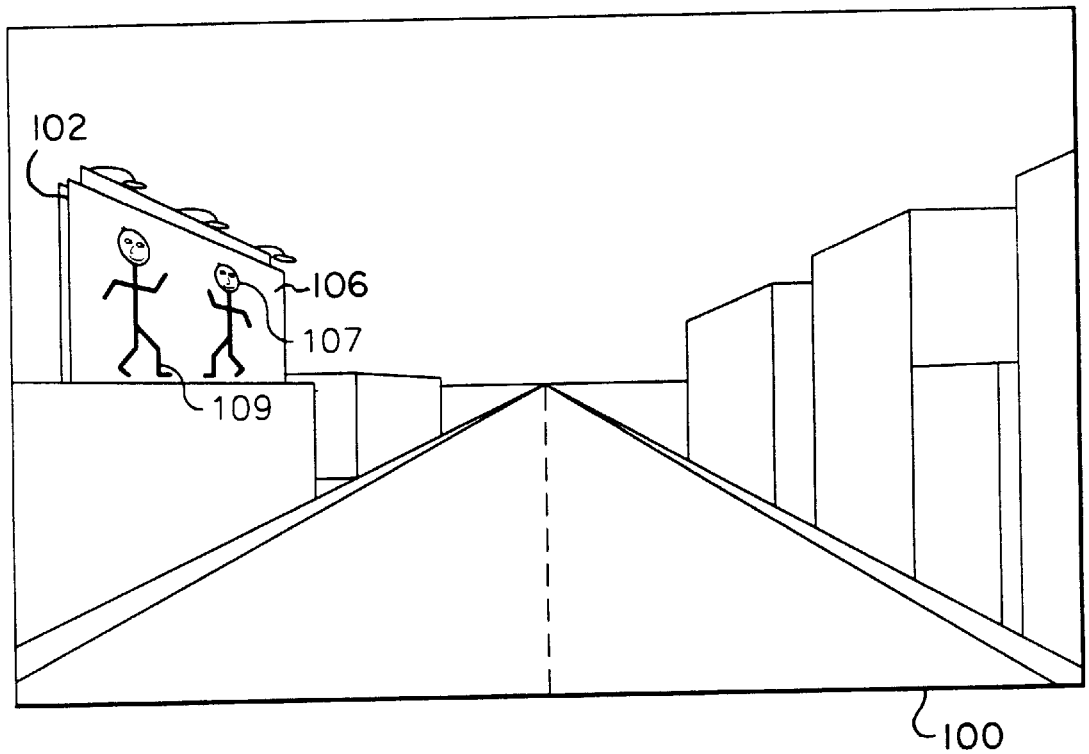
FIG. 7 illustrates the prestored digital image wherein the customer generated image is merged into the prestored digital image in accordance with the present invention.

Referring to FIG. 7, there is illustrated a customer generated image 106 modified in accordance with the present invention which has been placed at location 102 of digital prestored image 100. In this embodiment, the customer generated image 106 has been modified to have a corresponding 3-D structure to that of the image in which it is placed. As can be seen, the individual 107, which is to the right of the individual 109 in customer generated image 106, has been made smaller with respect to the image 109. In this respect, the dimensional relationship of the individual 107, 109 has been modified to correspond generally to the overall 3-D structure of the prestored digital image. The modified customer generated image 106 has been modified to have substantially the same visual 3-D structure of the prestored digital image 100. Thus image 106 does not appear to be simply pasted onto the prestored image 100 as illustrated in FIGS. 5 and 6. The merged image of FIG. 7 made in accordance with the present invention provides a visual 3-D structure of the customer generated image 106 which substantially matches that of the prestored digital image 100. This can be accomplished by knowing of the 3-D structure relationship of the prestored digital image at location 102 and adjusting the customer generated image 106 to substantially match the 3-D structure of the prestored digital image 100.

Referring to FIG. 8, there is illustrated an alternate/second prestored digital image 110 having a location 112 for receiving of a customer generated image 114 such as illustrated in FIG. 9. However, in this particular embodiment, the location 112 is the surface of a Christmas ornament. As is well known, the ornament has a generally three-dimensional shape. Thus, an image of this ornament must clearly represent this 3-D shape. In the preferred form of the present invention, the customer generated image 114 would be modified mathematically to correspond to the three-dimensional attribute of location 112.

Referring to FIG. 10, there is illustrated the customer generated image 114 merged with the second prestored digital image 110 of FIG. 8 in accordance with the prior art. As can be seen, the visual 3-D structure of the image 114 does not correspond to the three dimensional 3-D structure of the bulb and thus appears as if it was simply pasted on the bulb.

Referring to FIG. 11, there is illustrated the customer generated image 114 modified to conform to the location 112 in accordance with the present invention. Thus, the image 114 is not simply pasted into the area, but is mathematically modified to provide a corresponding three-dimensional relationship. This results in a more realistic representation of the merged image.

While the present invention has been shown to modify the customer generated image by 3-D structure view, i.e., such as illustrated in FIG. 3, and a three-dimensional shape such as illustrated in FIG. 8, the customer generated image may be modified in accordance with any other desired three-dimensional attributes. For example, but not by way of limitation, the customer generated image may be modified to provide an appropriate visual coarseness, shading, shading from a particular direction, texture, shape, or other spatial relationships with that of the prestored image.

Figure 2:
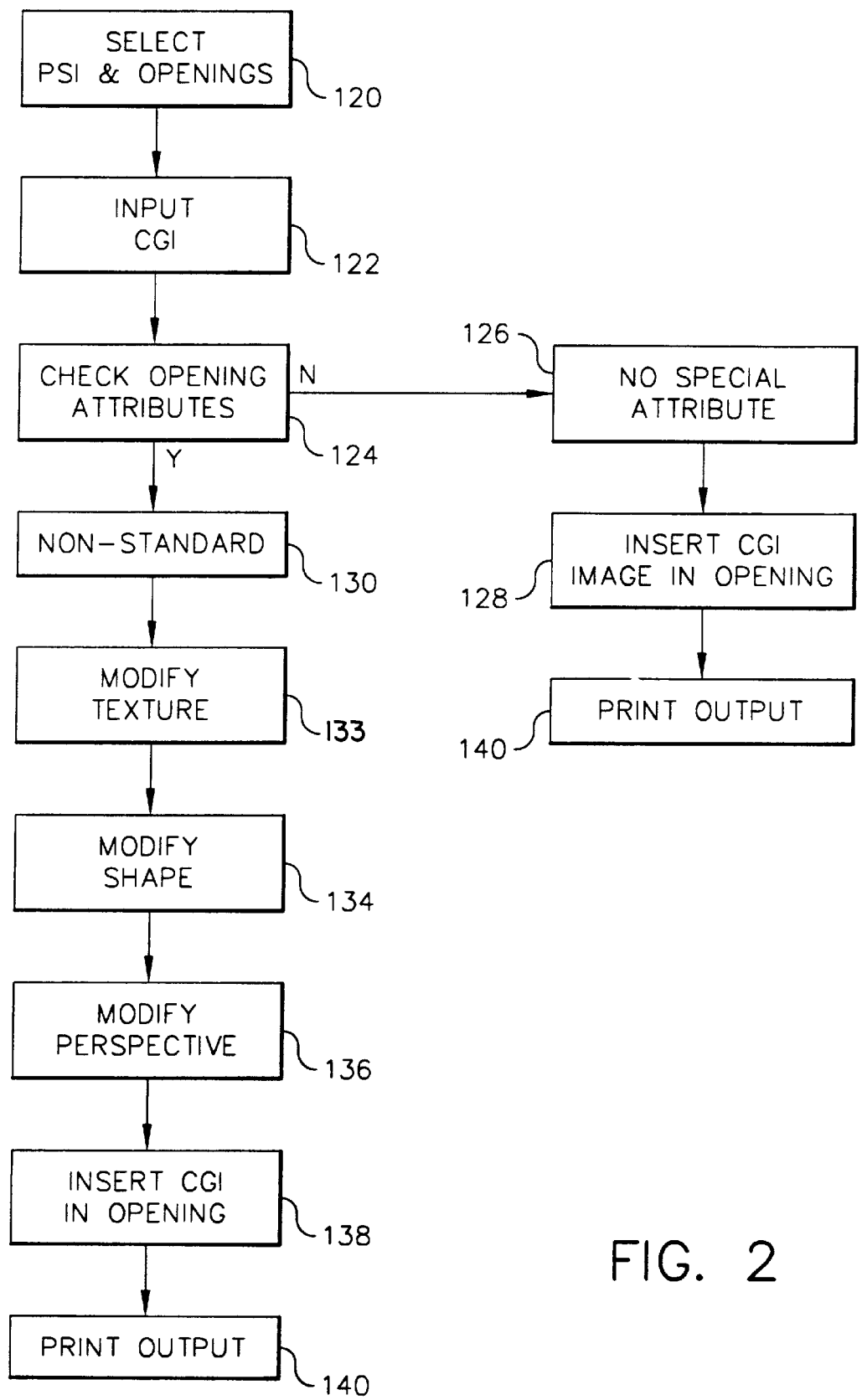
FIG. 2 is a block flow diagram illustrating the method according to the present invention.

Referring to FIG. 2, there is illustrated a flow diagram as to the steps on how to obtain digital merged images according to the present invention. First, at box 120, a prestored image is selected from the CPU 10. Next, at box 122, a customer generated image 106 is obtained, typically through one of the input devices 12, 14, 16, 18, 20, 22. Next, the CPU 10, at box 124, checks the attributes of the location 102 in prestored image 100. If no special design attribute (box 126) is assigned to location 102, the customer generated image 106 and prestored image is merged at box 128 and sent to an appropriate output device box 140. If a special design attribute is assigned to location 102, then the imaging process goes to box 130 where the specific design attribute of location 102 is determined. Depending on the design attribute associated with location 102, preselected by the particular prestored image selected, the customer generated image 106 is modified accordingly. If the customer generated image is to be modified by texture, then it is sent to box 133 and modified accordingly. If location 102 requires a specific shape as in FIG. 11, then it goes to step 134 where the image 106 is modified. If the location 102 requires a specific 3-D structure such as illustrated in FIG. 7, the image 106 is sent to box 136 where it is modified with the requirements of location 102. After the image 106 has been modified, it is then merged with image 100 at box 138. The merged image is then sent to an output device at box 140.

By modifying the customer generated image in accordance with the present invention, the merged image will not simply look as if the customer generated image was just simply pasted into the prestored digital image, but will provide overall visual continuity and thus provide a much more professional looking product. A merged digital image made in accordance with the present invention provides a consistent and integrated appearance, which provides a much more realistic and satisfying appearance than that of the prior art.

It is to be understood that various other changes and modifications may be made without departing from the scope of the present invention. The present invention being limited by the following claims.

We claim:

1. A method of combining at least one captured generated digital image and/or text with at least one prestored digital image, comprising the steps of:

a) selecting a prestored digital image, said prestored digital image having at least one predetermined location where a captured generated digital image and/or text may be placed, said predetermined location having a predetermined visual 3-D image structure;

b) providing at least one capture means for obtaining at least one customer generated image in digital form;

c) providing at least one output means for printing, displaying, transmitting, or storing of an image;

d) modifying said captured customer generated digital image in accordance with said predetermined 3-D image structure, so as to form a first modified image which has a visual 3D structure that corresponds to the visual 3D structure of said predetermined location;

e) combining the first modified image and said selected prestored digital image at said at least one predetermined location so as to form a newly merged digital image; and f) forwarding said merged digital image to said output means.

2. The method according to claim 1 wherein said predetermined 3-D structure image comprises a spatial relationship.

3. The method according to claim 2 wherein said spatial relationship comprises a line of sight.

4. The method according to claim 1 wherein said prestored design element comprises a three-dimensional geometric configuration.

5. The method according to claim 4 wherein said geometric configuration is substantially a sphere.

6. The method according to claim 1 wherein said predetermined image 3-D structure comprises shading.

7. The method according to claim 6 wherein said shading is from a particular direction.

8. The method according to claim 1 wherein said predetermined 3-D structure image comprises a texture.

9. The method according to claim 1 wherein said predetermined 3-D structure image comprises a shape.

10. The method according to claim 1 wherein said predetermined 3-D structure image comprises a perspective.

* * * * *